Feb. 8, 1966  J. W. SPRAUER  3,234,295
HYDROCARBON CHLORINATION
Filed Jan. 25, 1961
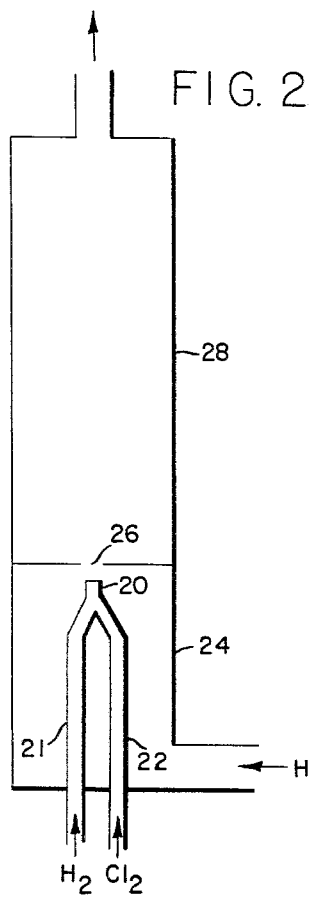
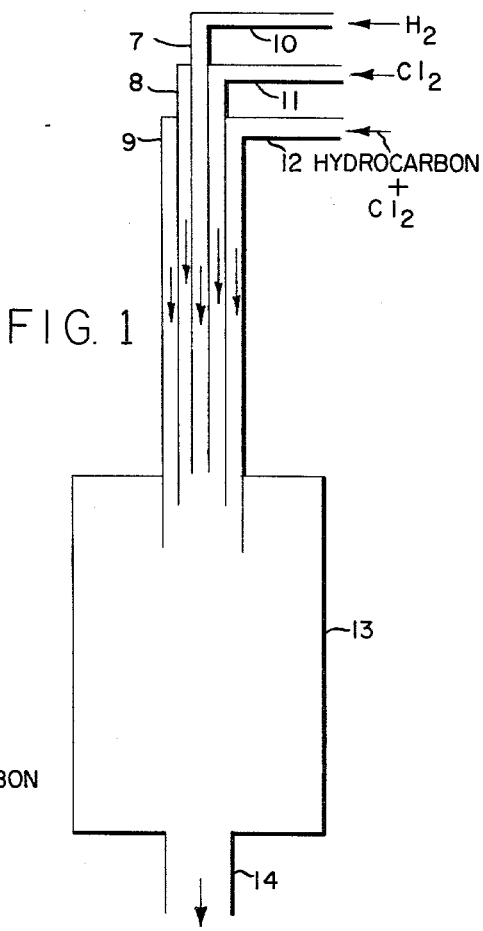
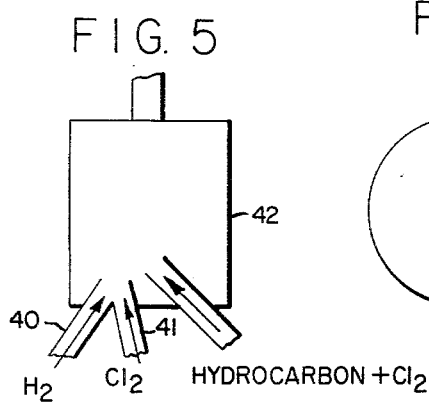
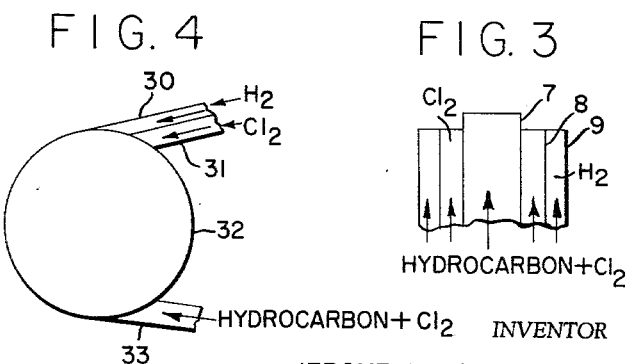
INVENTOR
JEROME W. SPRAUER
BY *Louis A. Wicher*
ATTORNEY

United States Patent Office 3,234,295
Patented Feb. 8, 1966

3,234,295
HYDROCARBON CHLORINATION
Jerome W. Sprauer, Shipley Heights, Wilmington, Del., assignor to E. I. du Pont de Nemours and Company, Wilmington, Del., a corporation of Delaware
Filed Jan. 25, 1961, Ser. No. 84,932
11 Claims. (Cl. 260—654)

This invention relates to a new and improved process for the chlorination of hydrocarbons or chlorohydrocarbons whereby to produce chlorohydrocarbons with or without the presence of chlorocarbons. The process of this invention is applicable to all hydrocarbons or chlorohydrocarbons to produce chlorohydrocarbons having a higher degree of chlorination or complete chlorination to chlorocarbons.

The reaction of chlorine with hydrocarbons or chlorohydrocarbons in a homogeneous gas phase is well known. Heretofore, such reactions were carried out by heating the reactants by heat transfer through solid walls, by mixing the reactants with heated gases, or by ignition of the mixed reactant gases. Such reactions were initiated either by purely thermal means, or photochemically, by irradiation with actinic light.

The reaction of chlorine with hydrocarbons is highly exothermic. In the case of substitutive chlorination of a hydrocarbon;

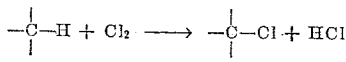

23 to 27 kcal. per mole $Cl_2$ is given off regardless of the nature of the hydrocarbon. Moreover, the complete reaction to carbon and hydrogen chloride is favored thermodynamically and such complete reaction is more highly exothermic than a mere substitutive chlorination. For example, methane reacting with chlorine to carbon and HCl produces 35 kcal. per mole $Cl_2$. Similarly, additive chlorination of a hydrocarbon involves a highly exothermic reaction;

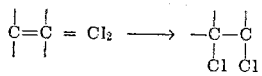

producing about 44 kcal. per mole $Cl_2$ in the additive chlorination of ethylene.

In general, the high exothermicity of possible reactions leads to flame and explosively violent reactions when the chlorine and hydrocarbons are present in stoichiometric proportions, in which case the thermodynamically favored reaction to the formation of carbon and HCl tends to proceed. Thus, it is generally necessary to moderate the reaction by a large excess of chlorine or hydrocarbon, or by the use of a diluent such as nitrogen, carbon oxides, hydrogen chloride, chlorinated products or the like. It is usually possible to mix the reactants at room temperature with negligible reaction. However, initiation of the reaction by heat transfer through solid walls generally leads to carbon deposition on the hot surface. Moreover, if the reaction mixture is in flamable proportions it is necessary to maintain the premixed feed stream above flame propagation speeds. Another expedient, heretofore practiced, to avoid complete reaction to carbon and HCl, is to mix chlorine with the preheated hydrocarbon, or chlorohydrocarbon, in small increments by jet injection above flame propagation speeds cooling as necessary between additions.

The previously used methods of hydrocarbon chlorination in the gas phase have not been fully satisfactory to produce the desired chlorinated hydrocarbons, or chlorocarbons, in high yields without the formation of considerable amounts of carbon.

It is an object of this invention to provide a new and improved, highly controllable process for the chlorination of hydrocarbons and chlorohydrocarbons for the production of chlorohydrocarbons and chlorocarbons.

It is another object of this invention to provide an improved process for reacting hydrocarbons and chlorohydrocarbons with chlorine in proportions to achieve exceptionally rapid reactions with relatively high yields and a minimum of undesired by-products.

Other objects of the invention will appear hereinafter.

The objects of this invention may be achieved by rapidly mixing, with the hot combustion gas from a hydrogen-chlorine flame, a gaseous mixture of a hydrocarbon, or a chlorohydrocarbon, with chlorine. Preferably, said two gases should be mixed in such proportions that the resulting end temperature upon complete adiabatic reaction does not exceed 1500° C., and in most cases it is preferred that it does not exceed 1000° C.

The hydrocarbon to be chlorinated may be an aliphatic, alicyclic or aromatic hydrocarbon, and it may contain substantially any number of carbon atoms, say 1 to 20 carbon atoms. Depending upon the hydrocarbon, or chlorohydrocarbon, used in the chlorination reaction, the chlorination will comprise an addition chlorination or substitution chlorination with or without the accompaniment of a dehydrochlorination. Also, particularly in the case of longer chain hydrocarbons, pyrolytic chlorinations, i.e., chlorinolyses may be involved, whereby carbon-to-carbon bonds are broken and the fragments chlorinated to produce molecules with fewer carbon atoms. Likewise, with the presence of hydrocarbon free radicals, or chlorohydrocarbon free radicals, there is always a tendency for such free radicals to combine to produce molecules with more carbon atoms per molecule, and in certain cases this may be a main objective for carrying out a process of this invention.

It is known that stoichiometric proportions of hydrogen and chlorine, at room temperature, will burn adiabatically to form a combustion gas having a temperature of approximately 2500° C. and containing the following, in approximate mole percentages:

88 mole percent HCl
4 mole percent $H_2$
8 mole percent Cl·
Traces of $Cl_2$ and H·

If this gas is cooled, it is progressively converted to HCl, and at a temperature of less than about 400° C. it is substantially completely converted to HCl. The atomic recombination of the H· and Cl· atoms, which is generally believed to require three-body collision processes, e.g.,

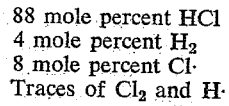
(M=third body)

are by no means instantaneous, although quite rapid, requiring, for example, a period of time on the order of a millisecond for 99% disappearance of the 8 mole percent of Cl· at atmospheric pressure, if instantaneously cooled to room temperature.

It is a generally accepted theory that gas phase chlorinations at high temperature proceed through an atomic chain reaction, i.e.,

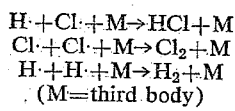

(R=any hydrocarbon or chlorohydrocarbon radical).

Thus, one chlorine atom may initiate the reaction of many, even hundreds or thousands, of hydrocarbon or chlorohydrocarbon molecules. Similarly, a hydrogen atom may do likewise since it reacts readily with chlorine molecules to produce chlorine atoms, e.g., $$Cl_2 + H \cdot \rightarrow HCl + Cl \cdot$$

It is also a generally accepted theory that gas phase additive chlorinations at high temperatures proceed through a similar atomic chlorine chain reaction; namely,

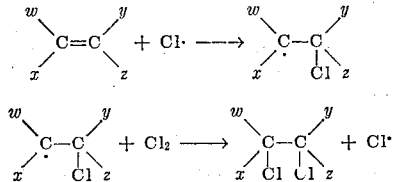

($w$, $x$, $y$, $z$=H, Cl, hydrocarbon or chlorohydrocarbon radical).

Whether chlorination of an unsaturate proceeds by substitution or addition is primarily a matter of temperature, the higher temperature favoring substitution.

There is a further possibility in high temperature gas phase chlorinations, according to accepted theory, of gas phase free radical dehydrochlorination chain reactions:

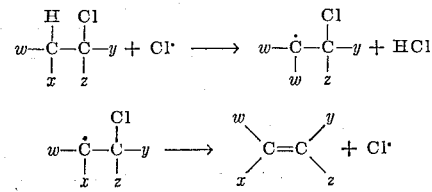

This chain reaction also is favored at higher temperatures, the net reaction being endothermic.

In thermal gas phase chlorinations these chains are thought to be initiated by thermal dissociation of chlorine:

$$Cl_2 \overset{\Delta}{\rightleftarrows} Cl \cdot + Cl \cdot$$

which, however, is relatively slow and occurs to a limited extent except at very high temperatures.

The process of the present invention differs greatly, both in procedure and in effect, from the prior art processes. By the process of this invention, chlorine atoms (sometimes referred to as chlorine free radicals) and traces of hydrogen atoms are first formed by igniting a stream of molecular hydrogen and chlorine, and very rapidly mixing such combustion gas containing the chlorine and hydrogen atoms with the mixture of hydrocarbon, or chlorohydrocarbon and molecular chlorine which latter mixture constitutes the reactant mixture for the chlorination reaction.

In view of the high exothermicity of chlorination reactions, as above described, it was quite surprising to find that a hydrocarbon, or chlorohydrocarbon, mixed with chlorine could be mixed, albeit rapidly, with a combustion gas containing atomic chlorine and hydrogen at a temperature on the order of 2500° C. without excessive uncontrolled reaction to carbon. That this is possible is attributed to the almost instantaneous initiation of an unusually larger number of reaction chain centers and the rapid attainment of a nearly homogeneous reacting mixture by vigorous mixing. Not only is atomic chlorine available from the $H_2$-$Cl_2$ combustion but the thermal energy of the combustion gas will tend to dissociate other molecular chlorine at the momentarily high localized temperature. Moreover, it is believed that rapid mixing, e.g., within time periods of the order of a few milliseconds, leads to reaction of a substantial fraction of the relatively high concentration of chlorine atoms in the $H_2$-$Cl_2$ combustion gas with the hydrocarbon to thereby initiate chlorination chains. While there is a tendency for the free atoms to recombine as the combustion gas is cooled by mixing with a cooler gas, there is simultaneously a competitive reaction if the cooler gas is reactive.

Thus, during the mixing process the following reactions of atomic chlorine are occurring simultaneously:

$$Cl \cdot + H \cdot + M \rightarrow HCl + M$$
$$Cl \cdot + Cl \cdot + M \rightarrow Cl_2 + M$$
$$Cl \cdot + RH \rightarrow R \cdot + HCl$$
(M=third body)

Regardless of theoretical explanations, it has been found in accordance with this invention that the reaction between a hydrocarbon, or a chlorohydrocarbon, and molecular chlorine can be carried out in a controlled manner by rapidly mixing the hydrocarbon-chlorine mixture with the hot combustion gas of a hydrogen-chlorine flame.

The rapid mixing of the $H_2$-$Cl_2$ combustion gas with the feed gas, i.e., the mixture of hydrocarbon and chlorine, as previously indicated, is necessary to uniformly distribute the chlorine and hydrogen atoms of the combustion gas throughout the body of the feed gas before the atoms have recombined in molecular form.

Any manner of rapid mixing may be employed. The speed of mixing will, of course, be dependent to some extent upon the rapidity of cooling of the gaseous mixture. In any case, it is preferred that the gases be well mixed within a period of 10 milliseconds.

Suitable apparatus for the rapid mixing of the combustion gases and the feed gases are shown in the accompanying illustrations in which;

FIGURE 1 is a diagrammatic side elevational view of a preferred form of chlorination apparatus for use in carrying out the process of this invention;

FIGURE 2 is a diagrammatic side elevational view of an alternative embodiment of chlorination apparatus;

FIGURES 3, 4 and 5 are further alternative forms of apparatus which may be used in carrying out the chlorination procedures of this invention.

Referring to FIGURE 1 of the drawings, reference numeral 7 refers to the central tube of three concentrically arranged tubes of which 8 designates the intermediate annular tube and 9 the outer annular tube. The three concentrically arranged tubes 7, 8 and 9 are provided with inlet pipes 10, 11 and 12 respectively. The concentric tubes are connected to a common reaction chamber 13.

In using this apparatus to carry out the chlorination process of this invention, the hydrogen and chlorine are passed into the reaction chamber through contiguous tubes, i.e., either through tubes 7 and 8 or through tubes 8 and 9. Preferably however, the hydrogen is passed into the reaction chamber through innermost tube 7, chlorine through intermediate annulus 8 and a pre-mixed hydrocarbon, or chlorohydrocarbon, and chlorine through outer annulus 9. As shown in the drawing, the inner tube 7 terminates inwardly a short distance from the termination of annulus 8 and annulus 8, in turn, terminates inwardly a short distance from the termination of outer annulus 9. This is the preferred construction to minimize carbonization. By thus recessing the $H_2$-$Cl_2$ flame a short delay time for flame combustion to occur is provided before mixing takes place between the $H_2$-$Cl_2$ combustion gases and the hydrocarbon-chlorine feed gases. This recessed construction is not essential, the mixing of the gas streams being quite adequate if the three concentric tubes all terminate in a common plane.

As is well known, gases can be rapidly mixed by the turbulence created by a high velocity gas jet issuing into a relatively quiet ambient gas. In general, the mixing between gas streams is more rapid, the greater the velocity gradient between layers. It is, therefore, preferred that the gas velocities of the inner tube, carrying hydrogen, and the intermediate annulus, carrying chlorine be relatively low, such that a laminar diffusion flame may be stabilized at the mixing zone of these two gases. The velocity of the feed gas composed of the hydrocarbon, or chlorohydrocarbon, and chlorine passing through the outer annulus is preferably much greater than the former velocities whereby the hot hydrogen-chlorine combustion gases are rapidly entrained and mixed with the feed gases. The feed gases are preferably pre-mixed at about room temperature before being fed to the outer annulus.

The apparatus is, of course, provided with a flame ignition device (not shown in the drawings) for example, a high frequency electric spark at a point adjacent the outlet of tubes 7 and 8 for the ignition of the $H_2$-$Cl_2$ flame.

The reactor chamber may have any size that is large enough to provide a contact time between the gases to complete the desired chlorination. The reaction gases are withdrawn from chamber 13 through outlet conduit 14.

Although a diffusion flame, as shown and described above is preferred, the hydrogen and chlorine to be fed to the combustion flame may be premixed and fed through an orifice to a sheltered flame zone. Such flame from premixed $H_2$-$Cl_2$ may involve flash-back problems and, therefore, diffusion flames are generally more satisfactory.

In an alternative burner construction, as shown in FIGURE 3 of the drawings, the premixed hydrocarbon and chlorine may be passed into a reaction zone from the central inner tube 7, the chlorine through the intermediate annulus and the hydrogen through the outer annulus. In this case, the central tube will be surrounded by an annular diffusion flame ring and the high velocity gas will issue from the central tube and the low velocity laminar flow from the two annuli.

In the apparatus of FIGURE 2, the hydrogen and chlorine are brought together to a common outlet 20 through parallel tubes 21 and 22 and the outlet 20 is surrounded in surrounding chamber 24 by a feed stream of pre-mixed hydrocarbon and chlorine gas. Means, not shown, are provided to ignite the $H_2$ and $Cl_2$ issuing from common outlet 20. The $H_2$-$Cl_2$ flame is in a somewhat sheltered zone and the combustion gases from the flame are entrained with the feed gases through orifice 26 into reaction chamber 28. In all of the apparatus herein described it is immaterial whether the flow of gases or the reactors are operated with an upward, downward or sidewise flow.

Referring to FIGURE 4 of the drawings the hydrogen and chlorine are passed tangentially into a reaction chamber 32, through parallel tubes 30 and 31. Again, means (not shown) are provided adjacent the outlet ends of tubes 30 and 31 to ignite the $H_2$-$Cl_2$ gas. The hot combustion products of the $H_2$-$Cl_2$ flame met by the feed gas flowing from an oppositely disposed tangential tube 33.

A somewht similar burner is shown in FIGURE 5 in which angularly disposed tubes 40 and 41 carry $H_2$ and $Cl_2$ into contact with each other at the approximate junction and common outlet of these tubes in reaction chamber 42. Immediately after ignition of the $H_2$-$Cl_2$ the combustion gases are met by a high velocity stream of feed gas whereby to rapidly mix the two gas streams.

In general, the proportions of the reactants used in carrying out the process of this invention will be chosen to give adiabatic end temperatures of between 400° C. and 1500° C., preferably in the range of 600° C. to 1000° C. Higher temperatures tend to give excessive carbonization and by-product formation, depending in part upon desired product composition and speed of cooling. However, the highest practicable end temperature consistent with acceptable by-product formation is desirable to obtain rapid reaction. If it is desired to minimize dehydrochlorination reactions, this will impose limitations on the end temperature, and it may be desirable in certain cases for this reason to operate with an end temperature as low as 400° C. On the other hand, if dehydrochlorination reactions are desired to take place, it may be desirable for this reason to operate at highest practical end temperatures.

The adiabatic end temperature can be controlled by the relative proportions of hydrogen and chlorine in the flame feed or the proportions of hydrocarbon, or chlorohydrocarbon, and chlorine in the feed gases; by the relative proportions of flame gases and feed gases; by preheating either the gases fed to the flame or the feed gases; by recycle of product chlorohydrocarbons, or chlorocarbons; by the use of inert diluents such as hydrogen chloride, nitrogen and the like.

Of course, the ratio of reactants, that is the ratio of chlorine, excluding the chlorine consumed in the flame, to the hydrocarbon and/or chlorohydrocarbon will determine the extent of chlorination of the product. The invention is useful in all possible chlorination reactions, ranging from incomplete chlorination of one carbon-hydrogen bond per molecule to complete chlorination of all carbon-hydrogen bonds in the molecule. Thus the ratio of chlorine to carbon-hydrogen bond (i.e., $Cl_2/H$) may be any chosen value but usually will lie within the range of 0.01 (mole/atom) to 10, giving due consideration to other proportions, namely, of flame and diluent, which result in a given adiabatic end temperature.

The extent of completion of the reaction will, of course, depend upon the temperature, pressure, concentration, and contact time in any given case. The invention is useful when carried out in such a way as to yield substantial extent of reaction of either or both reactants. Usually it will be desirable to adjust conditions to attain fairly complete reaction of one or both reactants. In any given case one may arrive at a given result by trial and error adjustment of reacting proportions, downstream contact time, and the like. Ordinarily the invention is useful in reactions carried out at atmospheric pressure, but for special reasons one may choose to operate at any other pressure.

The quantity of combustion gases issuing from the $H_2$-$Cl_2$ flame is not at all critical. The chlorine fed to the combustion flame should be at least about 1% of the total amount of molecular chlorine being fed as both combustion and feed gases, preferably 3% to 10% of such total chlorine. By far the greater portion of the chlorine is usually fed in admixture with the hydrocarbon, or chlorohydrocarbon. Usually, it is desirable to minimize the amount of flame gases, and this will be a matter of trial in any given case. The amount of flame gases required to achieve a given minimum effect will be lower the higher the effectiveness of the mixing operation.

Likewise, the ratio of hydrogen to chlorine fed to the flame is not at all critical as long as these materials are present in sufficient amounts to support combustion. A stoichiometric proportion is generally preferred.

A small excess of either hydrogen or chlorine will tend to lower the mixed flame gas temperature, but in any case, the combustion gas will remain rich in atomic chlorine. Excess chlorine feed to the flame tends to increase carbonization slightly in the mixing process. Dilution of the gases fed to the flame, for example, by mixing the hydrogen or chlorine feed with an equal part of nitrogen, lowers the combustion gas temperature while still retaining high concentrations of atomic chlorine in the combustion gas. Such flame dilution tends to minimize any carbonization in the mixing process. However, carbonization in the mixing operation is not a problem if entrainment of carbonaceous material in the flame combustion zone is avoided. The recessing of the flame, as illustrated in the drawings, accomplishes this by allowing a short delay time for combustion to occur before mixing with the main stream commences.

It will be appreciated that all temeratures intermediate between the feed stream of hydrocarbon, or chlorohydrocarbon, and chlorine and the temperature of the flame occur momentarily in the mixing zone, i.e., between room temperature and 2500° C. Since only relatively small proportions of flame gases are required, the temperature of the mixed gas stream is only moderately increased by the heat content of the combustion gas, the major temperature increase being provided by the exothermic reactions proceeding during and after the mixing of the combustion and hydrocarbon-chlorine feed gases.

The process of the invention provides an almost instantaneous heat output by the reactions and an almost instantaneous plentiful supply of free radical chain reaction centers, thus completely eliminating any induction period. The reaction proceeds at speeds approaching flame processes; however a visible flame is not established.

The speed of the reaction will vary with the particular reaction being carried out, but in general, it will be severalfold to a hundredfold faster than thermally induced reaction between the same reactants in accordance with previously known methods. This has a large practical and economic value in permitting designs of small reactors of high capacity. In practice, defining speed of reaction becomes a question of defining the minimum contact time or the maximum space-time-yield of the reaction. This is a matter of trial in any given case. Space-time-yield around 2000 lb. $Cl_2$ reacting/day/ft.$^3$ has been observed.

Possibly of greater significance than absolute minimization of reactor size, given a very fast reaction, is the fact that the reaction can occur completely in the gas phase with complete elimination of retaining wall effects, which is important in minimizing carbonization and tar formation. That is, the reactor downstream from the burner can be somewhat larger with cooled walls so that the reaction occurs in a turbulent gas jet issuing into a cooled or partially cooled, low velocity, recirculating product gas which is entrained by the reacting jet to provide a self-quenching effect. This is important also in simplifying the problems with materials of construction on large scale. For example, the walls may be water-cooled. Of course, the burner itself is cooled by the incoming feed gas.

If the reactor walls are insulated, they will be hot particularly at the exit. In this case there is a tendency to build a light polymeric carbonaceous deposit on the reactor surfaces. Of course, there is no point in maintaining a hot contact time any longer than necessary.

The general usefulness of the process is illustrated by the following examples:

*Example I*

A reactor constructed of "Vycor" glass, a quartz glass produced by Corning Glass Works, Corning, New York, as shown schematically in FIGURE 1 of the drawings, was used with burner dimensions as follows:

|  | Inside Diameter, mm. | Outside Diameter, mm. |
|---|---|---|
| Central tube | 1.0 | 1.9 |
| Intermediate tube | 4.0 | 5.9 |
| Outer tube | 7.7 | 10.4 |

The feed rates preheated to 200° C. were as follows:

Central tube: 50 $H_2$ cc./min. (standard temperature and pressure)
Intermediate annulus: 50 $Cl_2$+50 $N_2$ cc./min. (standard temperature and pressure)
Outer annulus: 200 $C_2H_4$+600 $C_2Cl_4$+660 $Cl_2$ cc./min. (standard temperature and pressure)

One may calculate the following port velocities at one atmosphere pressure:

Cm./sec.
Central tube ------------------------------- 185
Intermediate annulus ----------------------- 29
Outer annulus ------------------------------ 220

In operation the flame feeds and the perchloroethylene were turned on, the flame was lit, and the ethylene and chlorine were turned on in order.

The downstream reactor volume was 19 cc. with walls heated to a temperature of 500° C. These walls may be heated in any desired manner, e.g., by electric resistor coils.

The products were trapped, analyzed, and accounted by the following product distribution in percent conversion on carbon equivalent in the feed after allowing for recovery of the perchloroethylene fed.

Percent
Trichloroethylene ($C_2HCl_3$) ----------------- 17
Perchloroethylene ($C_2Cl_4$) ------------------- 15
Carbon tetrachloride ($CCl_4$) ----------------- 0
Perchlorobutadiene ($C_4Cl_6$) ----------------- 2
High boilers ---------------------------------- 0.5

34.5

The balance of the ethylene was accountable as lower-boilers, mostly vinyl chloride and dichloroethenes, which could be recycled to produce additional trichloroethylene and perchloroethylene. Reaction of chlorine was incomplete. About 515 cc./min. (standard temperature and pressure) HCl were produced. Assuming the low-boilers were principally chloroethylenes in amount to account for the observed hydrogen chloride, one may estimate an adiabatic end temperature in the range of 600–700° C.

*Example II*

In the same apparatus as Example I except that the downstream reactor volume was 61 cc. an experiment was run with the following feeds preheated to 300° C.:

Center: 50 $H_2$ cc./min. (STP)
Intermediate annulus: 50 $Cl_2$ cc./min. (STP)
Outer annulus: 500 $Cl_2$ cc.min. (STP)
    262 ethylene chloride ($CH_2ClCH_2Cl$) cc./min. (STP)
    262 sym.-tetrachloroethane ($CHCl_2CHCl_2$) cc./min. (STP)

The product distribution in percent conversion on carbon equivalent in the feed was accounted as follows:

Percent
Trichloroethylene ------------------------- 39
Perchloroethylene ------------------------- 3
Ethylene dichloride ----------------------- 1
Sym.-tetrachloroethane -------------------- 16
$CCl_4/C_4Cl_6$/high-boilers ----------------- Trace

69

The balance was accountable as low-boilers, which could be recycled, obviously, to produce additional trichloroethylene. Reaction of chlorine was incomplete. In this case, a more complete chemical balance would be required to estimate an adiabatic end temperature. This feed composition at 300° C. preheat reacting as follows:

$CH_2ClCH_2Cl + CHCl_2CHCl_2 + 2.2Cl_2 + 0.2H_2$
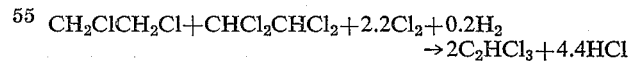
$\rightarrow 2C_2HCl_3 + 4.4HCl$ would give an adiabatic end temperature about 500° C.

*Example III*

In an apparatus similar to that of Example I with a 300 cc. reactor space (with the three concentric burner tubes terminating in the same plane, that is, without a recessed flame chamber) operation was carried out with the following feeds at room temperature:

Center: 50 $H_2$ cc./min. (STP)
Intermediate annulus: 100 $Cl_2$ cc./min. (STP)

Outer annulus:
    200 ethane cc./min. (STP)
    2000 chlorine cc./min. (STP)
    800 $N_2$ cc./min. (STP)

The product was trapped and analyzed and accounted for by the following product distribution in percent conversion on carbon equivalent in the feed:

| | Percent |
|---|---|
| Perchloroethylene | 91 |
| Pentachloroethane | 2.8 |
| Hexachloroethane | 1.7 |
| Perchlorobutadiene | 0.7 |
| Carbon tetrachloride | 3.7 |
| | 100.0 |

It was established that most of the above chloroethanes formed in the condensed product containing free chlorine on standing. Obviously, this could be minimized by prompt separation of chlorine from the product. In any case, these materials could be recycled to produce perchloroethylene.

This feed composition reacting as follows:

$$C_2H_6 + 10.25Cl_2 + 0.25H_2 + 4N_2 \rightarrow C_2Cl_4 + 6HCl + 5Cl_2 + 4N_2$$

would give an adiabatic end temperature of about 800° C. Actually, the walls were heated, by external heating, at mid-point to 550° C. with a low cooling gradient through the walls. One may estimate a nominal contact time around 2 sec.

A similar experiment with a 72 cc. reactor, 580° C. walls, gave about the same chemical result corresponding to a production of about 1700 lb. $C_2Cl_4$/day per ft.$^3$ or a nominal contact time of about 0.5 sec. The minimum contact time has not been established.

Example IV

The reactor described in Example III was operated with the following feeds at room temperature:

Center: 50 $H_2$ cc./min. (STP)
Intermediate annulus: 60 $Cl_2$ cc./min. (STP)
Outer annulus:
    2000 $Cl_2$ cc./min. (STP)
    150 $C_3H_8$ cc./min. (STP)
    800 $N_2$ cc./min. (STP)

The product was trapped, analyzed, and accounted as follows in percent conversion on carbon equivalent in the feed:

| | Percent |
|---|---|
| Carbon tetrachloride ($CCl_4$) | 34 |
| Perchloroethylene ($C_2Cl_4$) | 55+ |
| Pentachloroethane ($C_2HCl_5$) | 4 |
| Hexachloroethane ($C_2Cl_6$) | 6 |
| Perchlorobutadiene ($C_4Cl_6$) | 0.4 |
| | 100 |

One may estimate an adiabatic end temperature for this reaction at about 950° C.

Example V

The reactor described in Example III was operated with the following feeds at room temperature:

Center: 50 $H_2$ cc./min. (STP)
Intermediate: 100 $Cl_2$ cc./min. (STP)
Outer:
    2000 $Cl_2$ cc./min. (STP)
    100 n-$C_4H_{10}$ cc./min. (STP)
    200 $N_2$ cc./min. (STP)

The product was trapped, analyzed, and accounted for as follows in percent conversion on carbon equivalent in the feed:

| | Percent |
|---|---|
| Carbon tetrachloride | 6 |
| Perchloroethylene | 11 |
| Pentachloroethane | 0.6 |
| Hexachloroethane | 3— |
| Perchlorobutadiene | 80 |
| | 100 |

One may estimate an adiabatic end temperature for this reaction at about 950° C.

Example VI

The reactor described in Example III was operated with the following feeds at room temperature:

Center: 50 $H_2$ cc./min. (STP)
Intermediate: 60 $Cl_2$ cc./min. (STP)
Outer:
    2000 $Cl_2$ cc./min. (STP)
    400 $CH_4$ cc./min. (STP)
    800 $N_2$ cc./min. (STP)

The product was trapped, analyzed, and accounted for as follows in percent conversion on carbon equivalent in the feed:

| | Percent |
|---|---|
| Carbon tetrachloride | 34 |
| Perchloroethylene | 56 |
| Hexachlorobutadiene | 2 |
| Hexachlorobenzene ($C_6Cl_6$) | 6 |
| Unidentified high-boilers | 2 |
| | 100 |

One may estimate an adiabatic end temperature for this reaction in the range of 1000–1100° C.

Example VII

The reactor described in Example III was operated with the following feeds at room temperature:

Center: 50 $H_2$ cc./min. (STP)
Intermediate: 50 $Cl_2$ cc./min. (STP)
Outer:
    1500 $Cl_2$ cc./min. (STP)
    1000 $C_2H_6$ cc./min. (STP)

The product was analyzed and accounted for as follows in percent conversion on carbon equivalent in the feed:

| | Percent |
|---|---|
| Vinyl chloride | 37 |
| Vinylidene chloride | 9 |
| Sym.-dichloroethylenes | 2 |
| | 48 |

The balance was accounted for as acetylene and ethylene in approximate relative proportion of 1 to 8, respectively. These could obviously be recycled to achieve a closed cycle synthesis of mono- and di-chloroethylenes at high yield.

One may estimate an adiabatic end temperature for this reaction of roughly 800° C.

Example VIII

A reactor as shown diagrammatically in FIGURE 2 was used with the following feeds at room temperature:

Flame feed:
    70 $H_2$ cc./min. (STP)
    82 $Cl_2$ cc./min. (STP)
    120 $N_2$ cc./min. (STP)
Main stream feed:
    144 $Cl_2$ cc./min. (STP)
    110 $C_2H_4$ cc./min. (STP)
    2000 $N_2$ cc./min. (STP)

The product was analyzed and accounted for as follows in percent conversion on carbon equivalent in the feed:

| | Percent |
|---|---|
| Vinyl chloride | 35 |
| Vinylidene chloride | 38 |
| Sym.-dichloroethylenes | 5 |
| Trichloroethylene | 3 |
| High-boilers | Trace |
| | 81 |

Chlorine reaction was incomplete. Assuming unaccounted carbon and chlorine represents incomplete reaction, one may estimate an adiabatic end temperature for this reaction of about 500° C.

*Example IX*

The same reactor used in Example VIII was operated with the following feeds in vapor state:

Flame feed:
    70 $H_2$ cc./min. (STP)
    82 $Cl_2$ cc./min. (STP)
    120 $N_2$ cc./min. (STP)
Main stream feed:
    210 $Cl_2$ cc./min. (STP)
    100 ethylene chloride cc./min. (STP)
    270 $N_2$ cc./min. (STP)

The product was analyzed and approximately accounted for as follows in percent conversion on carbon equivalent in the feed:

|  | Percent |
|---|---|
| Dichloroethylenes | 2 |
| Trichloroethylene | 27 |
| Perchloroethylene | 44 |
| Asym.-tetrachloroethane | 3 |
| Perchlorobutadiene | 24 |
|  | 100 |

One may estimate an adiabatic end temperature for this reaction in the range of 900–1000° C.

*Example X*

The hot combustion gas from a flame of premixed hydrogen (400 cc./min., STP) and chlorine (500 cc./min.) was mixed through a 1.7 mm. capillary orifice with ethylene (2000 cc./min.) discharging into an uninsulated reactor space (18 cc.). The liquid condensate was 99% by weight ethylene chloride accounting for at least 88% conversion of the excess chlorine of the flame not allowing for probable vapor loss.

One may estimate an adiabatic end temperature for this reaction at about 600° C.

*Example XI*

In an apparatus similar to that shown in FIGURE 2 the combustion gas from a turbulent diffusion flame of hydrogen (100 cc./min., STP) and chlorine (50 cc./min.) was mixed through a 2 mm. orifice with a premixed stream of methane (500 cc./min.), chlorine (250 cc./min.), and nitrogen (500 cc./min.) discharging to a 42 cc. reactor with about 500° C. wall temperature. Reaction of chlorine was complete, and the product consisted of chloromethanes practically exclusively of the following distribution:

|  | Mole percent |
|---|---|
| Methyl chloride | 41 |
| Methylene chloride | 32 |
| Chloroform | 21 |
| Carbon tetrachloride | 6 |
|  | 100 |

One may estimate an adiabatic end temperature for this reaction at about 750° C.

*Example XII*

The burner described in Example I was used with a 300 cc. downstream reactor with bare walls. Feed rates with 310° C. preheat were as follows:

Center: 50 $H_2$ cc./min. (STP)
Intermediate: 50 $Cl_2$/50 $N_2$ cc./min. (STP)
Outer:
    250 $Cl_2$ cc./min. (STP)
    1000 n-butane cc./min. (STP)

Chlorine disappearance was complete, and one mole of hydrogen chloride was produced per mole of chlorine fed (excluding the flame). The liquid product distribution in approximate mole percent was:

| Sec.-butyl chloride | 60 |
|---|---|
| n-Butyl chloride | 34 |
| Dichlorobutanes | 6 |
|  | 100 |

One may estimate an adiabatic end temperature for this reaction at about 500° C.

*Example XIII*

In the same apparatus as Example XII operation was conducted with the following feed rates at 240° C. preheat:

Center: 50 $H_2$ cc./min. (STP)
Intermediate: 50 $Cl_2$/50 $N_2$ cc./min. (STP)
Outer:
    1000 $Cl_2$ cc./min. (STP)
    1000 n-butane cc./min. (STP)
    500 n-butyl chloride cc./min. (STP)

Chlorine disappearance was complete and 1.09 mole HCl/mole $Cl_2$ fed (excluding flame $Cl_2$) were produced. Product distribution in percent conversion on total carbon fed was approximately as follows, not including substantial unreacted butane which was not quantitatively analyzed:

|  | Percent |
|---|---|
| Sec.-butyl chloride | 22 |
| n-Butyl chloride | 31 |
| 1,3-dichlorobutane | 9 |
| 1,4-dichlorobutane | 4 |
| Other dichlorobutanes | 7 |
|  | 73 |

Assuming the unaccounted carbon was principally unreacted butane, one may estimate an adiabatic end temperature for this reaction in the range of 600–800° C.

Since it is obvious that many changes and modifications can be made in the above-described details without departing from the nature and spirit of the invention, it is to be understood that the invention is not to be limited to said details except as set forth in the appended claims.

I claim:

1. The process of chlorinating a substance taken from the group consisting of hydrocarbons and chlorohydrocarbons containing 1 to 20 carbon atoms which comprises mixing said substance with chlorine and the hot combustion gas from a flame based upon a substantially equimolecular mixture of hydrogen and chlorine, within 10 milliseconds after passing from said flame at an adiabatic end temperature of between 400 and 1500° C.

2. The process of chlorinating a substance taken from the group consisting of hydrocarbons and chlorohydrocarbons containing 1 to 20 carbon atoms which comprises mixing said substance with chlorine and the hot combustion gas from a flame based upon a substantially equimolecular mixture of hydrogen and chlorine, within 10 milliseconds after passing from said flame, at an adiabatic end temperature of between 600 and 1000° C.

3. The process of chlorinating a substance from the group consisting of hydrocarbons and chlorohydrocarbons containing 1 to 4 carbon atoms which comprises igniting a gas composed substantially of equimolecular proportions of hydrogen and chlorine to form a combustion flame, and mixing the products of the combustion with said substance and chlorine within a period of 10 milliseconds.

4. The process of chlorinating a substance from the group consisting of hydrocarbons and chlorohydrocarbons containing 1 to 20 carbon atoms which comprises igniting a gas composed substantially of equimolecular proportions of hydrogen and chlorine to form a combustion flame, and mixing the products of the combustion with said substance and chlorine within a period of 10 milliseconds.

5. The process of chlorinating a substance taken from the group consisting of hydrocarbons and chlorohydrocarbons containing 1 to 20 carbon atoms which comprises mixing said substance with chlorine and then mixing said mixture with the hot combustion gas from a flame based upon a substantially equimolecular mixture of hydrogen and chlorine, within 10 milliseconds after passing from said flame, at an adiabatic end temperature of between 400 and 1500° C.

6. The process of chlorinating a substance taken from the group consisting of hydrocarbons and chlorohydrocarbons containing 1 to 20 carbon atoms which comprises mixing said substance with chlorine and then mixing said mixture with the hot combustion gas from a flame based upon a substantially equimolecular mixture of hydrogen and chlorine, within 10 milliseconds after passing from said flame, at an adiabatic end temperature of between 600 and 1000° C.

7. The process of chlorinating a substance taken from the group consisting of hydrocarbons and chlorohydrocarbons containing 1 to 4 carbon atoms which comprises mixing said substance with chlorine, igniting a gas composed substantially of equimolecular proportions of hydrogen and chlorine to form a combustion flame and mixing the products of combustion with said mixed components within a period of 10 milliseconds.

8. The process of chlorinating a substance taken from the group consisting of hydrocarbons and chlorohydrocarbons containing 1 to 20 carbon atoms which comprises mixing said substance with chlorine, igniting a gas composed substantially of equimolecular proportions of hydrogen and chlorine to form a combustion flame in which the hot products of combustion contain atomic chlorine, and mixing said hot atomic chlorine-containing products of combustion, within 10 milliseconds after passing from said flame, with said mixed components.

9. The process of chlorinating a hydrocarbon containing two carbon atoms which comprises igniting a gas composed substantially of equimolecular proportions of hydrogen and chlorine to form a combustion flame and mixing the products of the combustion with said hydrocarbon and chlorine within a period of 10 milliseconds.

10. The process of chlorinating a chlorohydrocarbon containing two carbon atoms which comprises igniting a gas composed substantially of equimolecular proportions of hydrogen and chlorine to form a combustion flame and mixing the products of the combustion with said hydrocarbon and chlorine within a period of 10 milliseconds.

11. The process of chlorinating a substance taken from the group consisting of hydrocarbons and chlorohydrocarbons containing 1 to 20 carbon atoms which comprises mixing said substance with chlorine and the hot combustion gas from a hydrogen-chlorine flame based upon a substantially equimolecular mixture of hydrogen and chlorine, within 10 milliseconds after passing from said flame and before said combustion gas has come into contact with any retaining wall, at an adiabatic end temperature of between 400° C. and 1500° C.

References Cited by the Examiner
UNITED STATES PATENTS

| | | | |
|---|---|---|---|
| 2,585,469 | 2/1952 | Johnson | 260—662 |
| 2,664,342 | 12/1953 | Johnson | 260—662 |
| 2,838,579 | 6/1958 | Conrad et al. | 260—662 |

LEON ZITVER, *Primary Examiner.*

ALPHONSO D. SULLIVAN, *Examiner.*